United States Patent
Horii et al.

(10) Patent No.: US 11,423,025 B2
(45) Date of Patent: Aug. 23, 2022

(54) DIRECT DATA LOADING OF MIDDLEWARE-GENERATED RECORDS

(71) Applicant: INTERNATIONAL BUSINESS MACHINES CORPORATION, Armonk, NY (US)

(72) Inventors: Hiroshi Horii, Tokyo (JP); Mikio Takeuchi, Kanagawa (JP); Rina Inoue, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 255 days.

(21) Appl. No.: 16/939,149

(22) Filed: Jul. 27, 2020

(65) Prior Publication Data

US 2022/0027370 A1 Jan. 27, 2022

(51) Int. Cl.
*G06F 16/14* (2019.01)
*G06F 16/2453* (2019.01)
(Continued)

(52) U.S. Cl.
CPC ...... *G06F 16/24549* (2019.01); *G06F 3/0604* (2013.01); *G06F 3/0659* (2013.01); *G06F 3/0674* (2013.01); *G06F 16/152* (2019.01); *G06F 16/172* (2019.01); *G06F 16/217* (2019.01)

(58) Field of Classification Search
CPC ....... G06F 3/0604–0674; G06F 16/134; G06F 16/182–1844; G06F 16/27–278; G06F 16/152

See application file for complete search history.

(56) References Cited

U.S. PATENT DOCUMENTS 5,640,555 A * 6/1997 Kleewein ................ G06F 16/27
5,768,577 A * 6/1998 Kleewein ................ G06F 16/27
(Continued)

FOREIGN PATENT DOCUMENTS

CN 1871598 A 11/2006
CN 110603524 A 12/2019
(Continued)

OTHER PUBLICATIONS

International Search Report and Written Opinion issued in corresponding PCT Application No. PCT/IB2021/056489 dated Nov. 24, 2021, 9 pgs.

*Primary Examiner* — Robert W Beausoliel, Jr.
*Assistant Examiner* — Nirav K Khakhar
(74) *Attorney, Agent, or Firm* — Tutunjian & Bitetto, P.C.; Randall Bluestone

(57) ABSTRACT

A computer-implemented method is presented for reducing data loading overhead of middleware to facilitate direct data loading to a database management system (DBMS). The method includes, while data loading, sending external-writes to a memory-based DBMS if corresponding internal-writes are for vertices, exporting all the external-writes to a disk-based DBMS as an export file, and sending an external-read for vertices to an in-memory DBMS if the middleware requests data. The method further includes, at the end of data loading, generating files for raw data of the disk-based DBMS from the export file and sending the generated raw files to the disk-based DBMS.

25 Claims, 12 Drawing Sheets

(51) Int. Cl.
  *G06F 16/172* (2019.01)
  *G06F 3/06* (2006.01)
  *G06F 16/21* (2019.01)

(56) References Cited

U.S. PATENT DOCUMENTS

| | | | | |
|---|---|---|---|---|
| 5,930,793 | A * | 7/1999 | Kleewein | G06F 16/27 709/227 |
| 6,167,405 | A * | 12/2000 | Rosensteel, Jr. | G06F 16/283 707/999.102 |
| 6,285,997 | B1 * | 9/2001 | Carey | G06F 16/24539 |
| 6,321,374 | B1 * | 11/2001 | Choy | G06F 16/284 707/999.002 |
| 6,442,541 | B1 * | 8/2002 | Clark | G06F 16/252 |
| 7,150,015 | B2 * | 12/2006 | Pace | H04L 63/08 709/236 |
| 7,197,496 | B2 * | 3/2007 | Daniel | G06F 16/90335 707/999.005 |
| 7,209,921 | B2 * | 4/2007 | Pace | G06F 9/544 707/999.005 |
| 7,430,610 | B2 * | 9/2008 | Pace | H04L 67/288 717/172 |
| 7,472,125 | B2 * | 12/2008 | Shimizu | G06F 11/1471 |
| 7,752,214 | B2 * | 7/2010 | Pizzorni | H04L 67/1095 707/756 |
| 7,774,298 | B2 * | 8/2010 | Trivedi | G06F 9/466 707/625 |
| 8,099,398 | B2 * | 1/2012 | Shimizu | G06F 11/1471 707/674 |
| 8,103,624 | B2 * | 1/2012 | Olivieri | G06F 16/219 707/610 |
| 8,244,747 | B2 * | 8/2012 | Agrawal | G06F 16/25 707/759 |
| 8,250,027 | B2 * | 8/2012 | Fujiyama | G06F 16/2452 707/602 |
| 8,326,883 | B2 * | 12/2012 | Pizzorni | H04L 67/10 707/795 |
| 8,386,525 | B2 * | 2/2013 | Pace | G06Q 30/02 707/796 |
| 8,458,142 | B2 * | 6/2013 | Pace | G06F 8/65 707/690 |
| 8,458,222 | B2 * | 6/2013 | Bobick | H04L 63/12 709/227 |
| 8,473,468 | B2 * | 6/2013 | Pace | H04L 63/12 707/806 |
| 8,527,545 | B2 * | 9/2013 | Bobick | H04L 67/568 707/826 |
| 8,650,226 | B2 * | 2/2014 | Bobick | H04L 63/08 707/812 |
| 8,666,933 | B2 * | 3/2014 | Pizzorni | G06Q 10/10 707/602 |
| 8,713,062 | B2 * | 4/2014 | Bobick | G06F 8/65 707/962 |
| 8,805,895 | B2 * | 8/2014 | Moulckers | G06F 16/217 707/803 |
| 8,812,458 | B2 * | 8/2014 | Moulckers | G06F 8/36 707/688 |
| 9,251,211 | B2 * | 2/2016 | Manzano Macho | G06F 16/8365 |
| 9,336,263 | B2 | 5/2016 | Abadi et al. | |
| 9,892,137 | B2 * | 2/2018 | Olivieri | G06F 16/219 |
| 10,606,833 | B2 * | 3/2020 | Sirohi | G06F 21/6227 |
| 10,700,948 | B2 * | 6/2020 | Bai | G06F 9/44526 |
| 10,838,935 | B2 * | 11/2020 | Olivieri | G06F 16/219 |
| 2003/0037173 | A1 * | 2/2003 | Pace | H04L 67/34 719/310 |
| 2003/0050932 | A1 * | 3/2003 | Pace | H04L 63/08 |
| 2003/0051066 | A1 * | 3/2003 | Pace | H04L 67/568 719/316 |
| 2003/0051236 | A1 * | 3/2003 | Pace | H04L 63/12 717/177 |
| 2003/0074207 | A1 * | 4/2003 | Pace | G06F 8/60 709/204 |
| 2003/0074360 | A1 * | 4/2003 | Chen | H04L 69/329 |
| 2003/0078958 | A1 * | 4/2003 | Pace | G06F 9/544 709/201 |
| 2003/0084134 | A1 * | 5/2003 | Pace | H04L 9/40 709/223 |
| 2003/0101223 | A1 * | 5/2003 | Pace | H04L 69/40 707/999.001 |
| 2003/0131084 | A1 * | 7/2003 | Pizzorni | H04L 63/0823 709/219 |
| 2003/0140111 | A1 * | 7/2003 | Pace | H04L 69/40 709/214 |
| 2003/0158937 | A1 * | 8/2003 | Johal | G06F 9/542 709/224 |
| 2003/0172135 | A1 * | 9/2003 | Bobick | H04L 69/329 709/201 |
| 2004/0103079 | A1 * | 5/2004 | Tokusho | G06F 16/21 |
| 2004/0117359 | A1 * | 6/2004 | Snodgrass | G06F 16/2477 |
| 2013/0173615 | A1 | 7/2013 | Xu | |
| 2016/0154812 | A1 | 6/2016 | Lee et al. | |
| 2019/0102412 | A1 * | 4/2019 | Macnicol | G06F 16/219 |
| 2019/0347342 | A1 | 11/2019 | Kameswaran et al. | |
| 2022/0027370 | A1 * | 1/2022 | Horii | G06F 16/217 |

FOREIGN PATENT DOCUMENTS

| | | |
|---|---|---|
| CN | 111427901 A | 7/2020 |
| WO | 2016105624 A1 | 6/2016 |
| WO | 2018136771 A1 | 7/2018 |

* cited by examiner

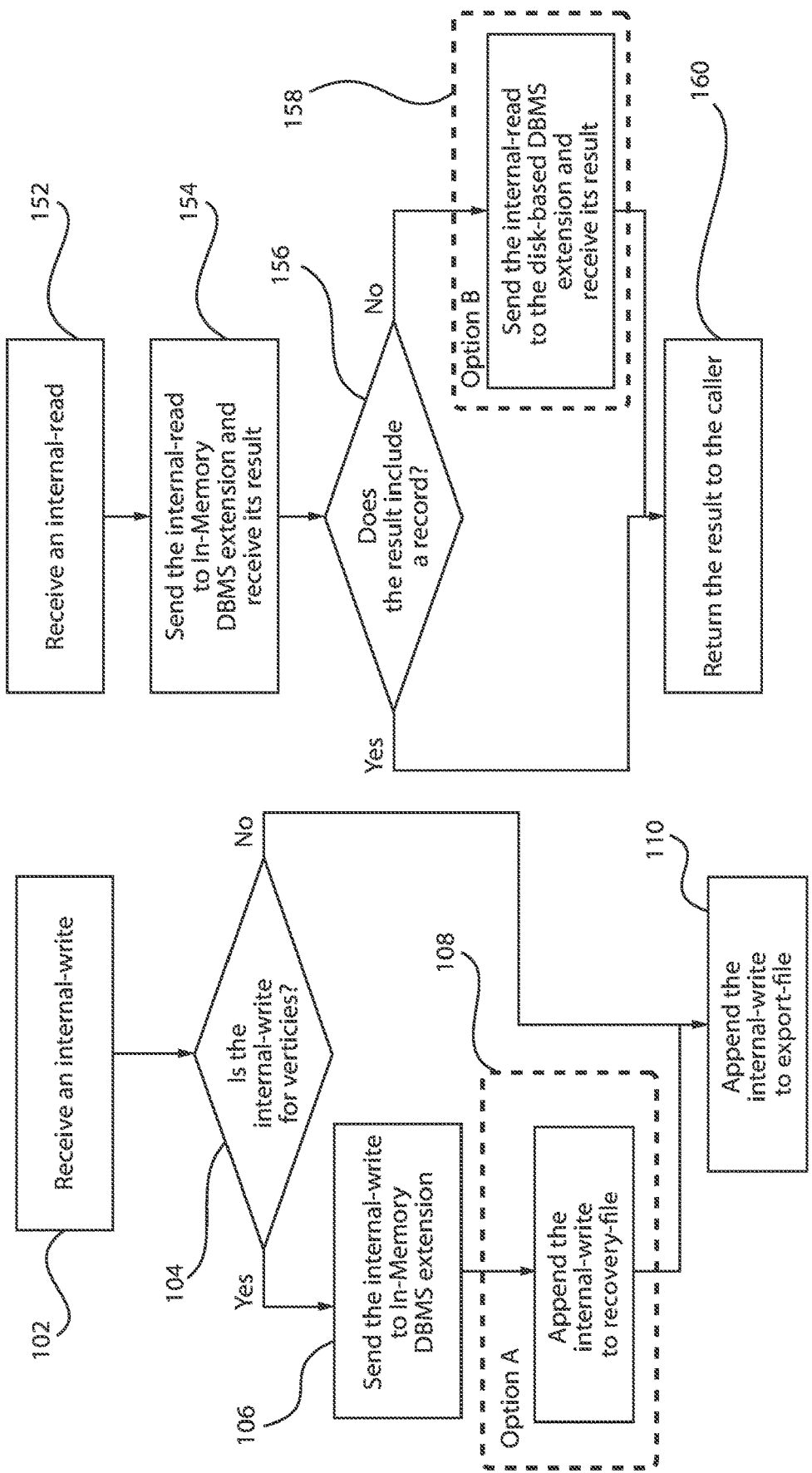

DIRECT DATA LOADING OF MIDDLEWARE-GENERATED RECORDS

BACKGROUND

The present invention relates generally to database management systems, and more specifically, to direct data loading of middleware-generated records to database management systems.

The ability to act quickly and decisively in today's increasingly competitive marketplace is important to the success of organizations. The volume of information that is available to corporations is rapidly increasing and frequently overwhelming. Those organizations that will effectively and efficiently manage these massive volumes of data, and use the information to make business decisions, will realize a competitive advantage in the marketplace. Such competitive advantage can be achieved by using a Database Management System (DBMS), which stores large volumes of data to support diverse workloads and heterogeneous applications. The DBMS is beneficial to business transaction processing and decision making, and can incorporate strategies that promote keeping the data highly available.

The DBMS is a database program that uses a standard method of cataloging, retrieving, and running queries on data. The DBMS manages incoming data, organizes the data, and provides ways the data can be modified or extracted by users or other programs. The DBMS provides a query language and report writer that allows users to interactively interrogate the relational database. These essential components give users access to all management information as needed. The DBMS applies entered text to the database as criteria to identify and report records in the database that meet the criteria. Entering the text into the fields of the DBMS requires the user to have an understanding of the DBMS and how the DBMS represents the data in the database. For example, for a given search term, the user must know which field in the DBMS is appropriate for searching that term. For a search query with multiple search terms, the user must be familiar with multiple fields in the DBMS, and how those fields will interact to limit or otherwise define a search. Also, the user must know the hierarchical structure between database tables and the keys for linking the tables together.

A common goal of DBMSs is to provide high performance in terms of transaction throughput and transaction latency to minimize hardware cost, wait time and increase the number of transactions per unit of time. Even with large investments in hardware, achieving the desired performance is often expensive and sometimes not possible. Another common goal of DBMSs is to reduce complexity with respect to the application development process and thus save time and money, as well as reduce the risk of errors.

However, conventional DBMSs are built around the assumption that data loading is a "one-time deal." Data loading is considered an offline process out of the critical path, with the user defining a schema and loading the majority of the data in "one go" before submitting any queries. When this architectural design assumption is combined with the explosive data growth, the result is the emergence of data loading as a bottleneck in the data analysis pipeline of DBMSs.

Nevertheless, some analytics need data loading to DBMS in advance. Middleware can be beneficial if a DBMS provides a simple application programming interface (API) for analytics. However, middleware can also present overheads when data loading takes place. Thus, data loading in DBMSs can cause bottlenecks. Approaches are thus necessary to reduce data loading in DBMS.

SUMMARY

In accordance with an embodiment, a method is provided for reducing data loading overhead of middleware to facilitate direct data loading to a database management system (DBMS). The method includes, while data loading, sending external-writes to a memory-based DBMS if corresponding internal-writes are for vertices, exporting all the external-writes to a disk-based DBMS as an export file, and sending an external-read for vertices to an in-memory DBMS if the middleware requires data. The method further includes, at the end of data loading, generating files for raw data of the disk-based DBMS from the export file and sending the generated raw files to the disk-based DBMS.

In accordance with another embodiment, a system is provided for reducing data loading overhead of middleware to facilitate direct data loading to a database management system (DBMS). The system includes a memory and one or more processors in communication with the memory configured to, while data loading, send external-writes to a memory-based DBMS if corresponding internal-writes are for vertices, export all the external-writes to a disk-based DBMS as an export file, and send an external-read for vertices to an in-memory DBMS if the middleware requires data. The system, at the end of data loading, further generates files for raw data of the disk-based DBMS from the export file and sends the generated raw files to the disk-based DBMS.

In accordance with yet another embodiment, a non-transitory computer-readable storage medium comprising a computer-readable program for reducing data loading overhead of middleware to facilitate direct data loading to a database management system (DBMS) is presented. The non-transitory computer-readable storage medium performs the steps of, while data loading, sending external-writes to a memory-based DBMS if corresponding internal-writes are for vertices, exporting all the external-writes to a disk-based DBMS as an export file, and sending an external-read for vertices to an in-memory DBMS if the middleware requires data. The non-transitory computer-readable storage medium performs the steps of, at the end of data loading, generating files for raw data of the disk-based DBMS from the export file and sending the generated raw files to the disk-based DBMS.

In accordance with an embodiment, a method is provided for reducing data loading overhead of middleware to facilitate direct data loading to a database management system (DBMS). The method includes receiving an internal-write in an export extension of the middleware, determining whether the internal-write is for vertices, sending the internal-write to an in-memory DBMS when the internal write is for vertices, and appending the internal-write to a recovery file.

In accordance with another embodiment, a method is provided for reducing data loading overhead of middleware to facilitate direct data loading to a database management system (DBMS). The method includes receiving an internal-read in an export extension of the middleware, sending the internal-read to an in-memory DBMS to receive a result, determining whether the result includes a record, and if the result is free of a record, sending the internal-read to a disk-based DBMS.

The advantages of the present invention include reducing data loading via middleware. The advantages of the present invention further include more efficient central processing unit (CPU) utilization and more efficient input/output (I/O) bandwidth utilization. Data loading is an upfront investment that DBMSs have to undertake in order to be able to support efficient query execution. Given the amount of data gathered by applications today, it is important to minimize the overhead of data loading to prevent data loading from becoming a bottleneck in the data analytics pipeline. This results in a higher storage capacity, faster processing, and better transfer speed of the unstructured data. Further advantages include higher quality, reduced cost, clearer scope, faster performance, fewer application errors, and fewer data errors.

In one preferred aspect, while data loading, the sending of the external-writes step further includes exporting the internal-writes as a recovery file.

In another preferred aspect, at a start of data loading, if the recovery file exists, generate the external-writes to the memory-based DBMS from the recovery file and send the generated external-writes to the memory-based DBMS.

In yet another preferred aspect, while data loading, the sending of the external-read step further includes sending the external-read to the disk-based DBMS if the in-memory DBMS does not fetch any.

In yet another preferred aspect, an export extension of the middleware supports both disk-based DBMS and memory-based DBMS.

In yet another preferred aspect, an export extension of the middleware processes the internal-writes and internal reads.

In yet another preferred aspect, if internal-writes are not for vertices, the internal-writes are appended to the export file.

It should be noted that the exemplary embodiments are described with reference to different subject-matters. In particular, some embodiments are described with reference to method type claims whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be described within this document.

These and other features and advantages will become apparent from the following detailed description of illustrative embodiments thereof, which is to be read in connection with the accompanying drawings.

BRIEF DESCRIPTION OF THE DRAWINGS

The invention will provide details in the following description of preferred embodiments with reference to the following figures wherein:

FIG. 2 is an exemplary flowchart illustrating a methodology when receiving an internal-write, in accordance with an embodiment of the present invention;

FIG. 3 is an exemplary flowchart illustrating a methodology when receiving an internal-read, in accordance with an embodiment of the present invention;

Throughout the drawings, same or similar reference numerals represent the same or similar elements.

DETAILED DESCRIPTION

Figure 1:
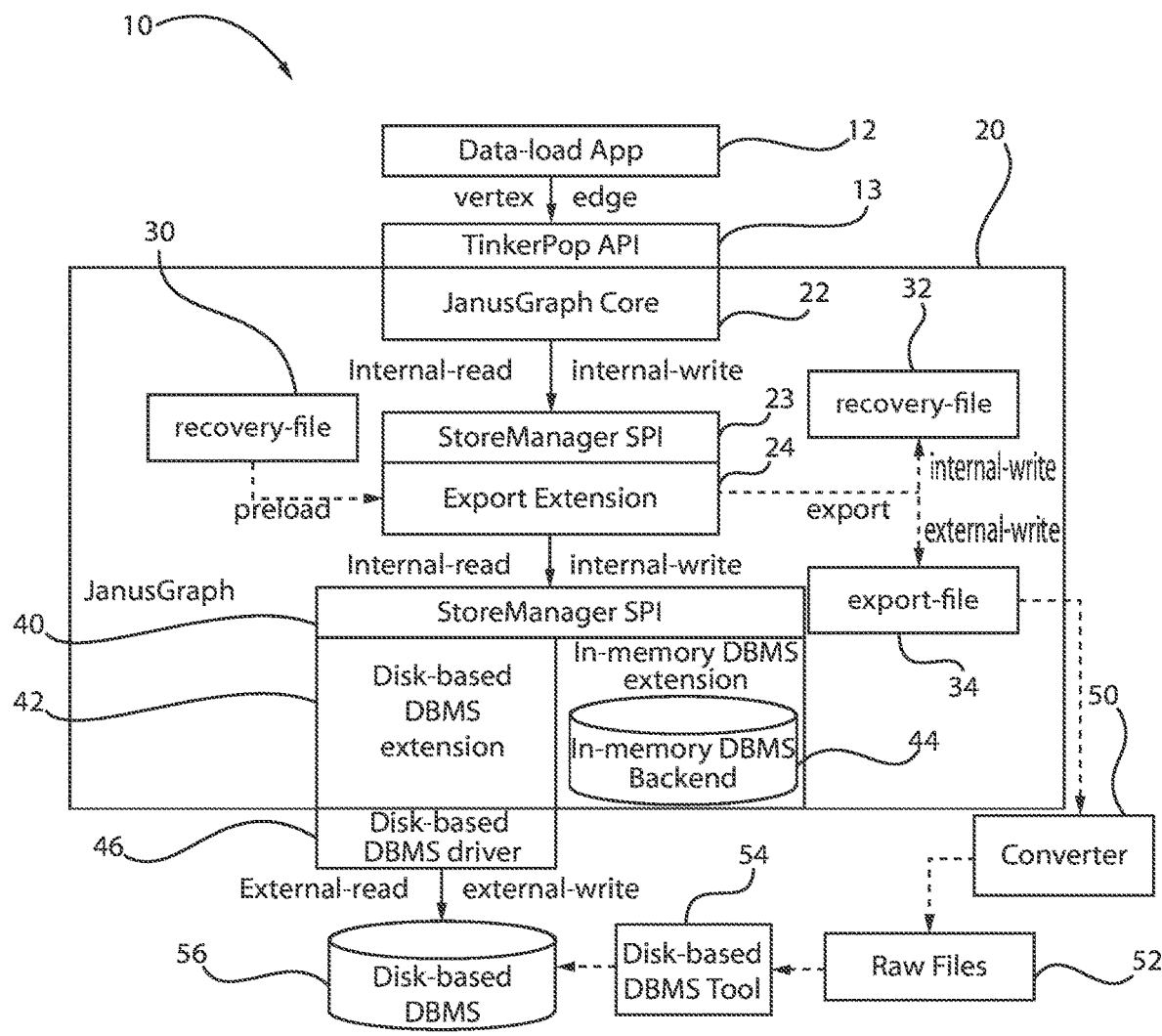
FIG. 1 is an exemplary middleware architecture for direct data loading of middleware-generated records to database management systems (DBMS), in accordance with an embodiment of the present invention.

Embodiments in accordance with the present invention provide methods and devices for employing direct data loading of middleware-generated records to database management systems (DBMS). DBMS is a collection of interrelated data and set of programs to store and access those data in an easy and effective manner. Database systems are developed for large amounts of data. When dealing with large amounts of data, there are two things that need optimization, storage of data and retrieval of data. Data load is the process that involves taking transformed data and loading the transformed data where users can access such transformed data. Data loading has been considered a "one-time deal," that is an offline process out of the critical path of query execution. The architecture of DBMS is aligned with this assumption. Nevertheless, the rate in which data is produced and gathered nowadays has nullified the "one-off" assumption, and has turned data loading into a bottleneck of the data analysis pipeline.

The exemplary embodiments of the present invention advantageously assume middleware converts an internal representation of an update (internal-write) to one or more commands of updates (external-write) for DBMS. Moreover, an internal-write for vertices can be advantageously identified in data loading, middleware can advantageously support disk-based and memory-based DBMS, and disk-based DBMS advantageously provides a way to directly add files for its raw data.

The exemplary embodiments of the present invention advantageously employ an extension of middleware that manages both disk-based and memory-based DBMS. While data loading, the extension sends external-writes to the memory-based DBMS if corresponding internal-writes are for vertices, exports the internal-writes as a file (recovery-file), exports all the external-write to disk-based DBMS as a file (export-file), and sends an external-read for vertices to the in-memory DBMS if middleware requires/requests data. In another option, the extension sends an external-read to the disk-based DBMS if the in-memory DBMS does not fetch any. At the end of data loading, the extension or the other component advantageously generates files for raw data of the disk-based DBMS from the export-file and sends them to the disk-based DBMS. In another embodiment, at the beginning of data loading, if a recovery-file exits, the extension advantageously generates external-writes to the memory-based DBMS from the file and sends them to the memory-based DBMS.

It is to be understood that the present invention will be described in terms of a given illustrative architecture; however, other architectures, structures, substrate materials and process features and steps/blocks can be varied within the scope of the present invention. It should be noted that certain features cannot be shown in all figures for the sake of clarity. This is not intended to be interpreted as a limitation of any particular embodiment, or illustration, or scope of the claims.

FIG. 1 is an exemplary middleware architecture for direct data loading of middleware-generated records to database management systems (DBMS), in accordance with an embodiment of the present invention.

The middleware architecture 10 includes a data loading application 12 where vertices and edges of graphs are fed into TinkerPop™ API 13. A graph is a structure composed of vertices and edges. Both vertices and edges can have an arbitrary number of key/value-pairs called properties. Vertices denote discrete objects such as a person, a place, or an event. Edges denote relationships between vertices. For instance, a person might know another person, have been involved in an event, and/or have recently been at a particular place. Properties express non-relational information about the vertices and edges. Example properties include a vertex having a name and an age, and an edge having a timestamp and/or a weight. Together, the aforementioned graph is known as a property graph and it is the foundational data structure of Apache TinkerPop™. Apache TinkerPop™ is a graph computing framework for both graph databases (OLTP) and graph analytic systems (OLAP).

The TinkerPop™ API 13 can be integrated with JanusGraph 20. JanusGraph 20 is a scalable graph database optimized for storing and querying graphs including hundreds of billions of vertices and edges distributed across a multi-machine cluster. JanusGraph 20 includes a JanusGraph Core 22, a first storage manager SPI 23, and a second storage manager SPI 40. The JanusGraph Core 22 provides internal-reads and internal-writes to the storage manager SPI 23. The storage manager 23 advantageously includes an export extension 24. The export extension 24 receives internal-writes and internal-reads and processes them. The export extension 24 is a component that supports SPIs 23, 40. The export extension 24 coordinates multiple extensions that support SPIs 23, 40 with functions of pre-load and export data. Since the export extension 24 uses only SPIs 23, 40 to access other extensions, no modification to JanusGraph 20 is necessary.

The export extension 24 receives recovery-files 30, and while data loading the extension, sends external-writes to the in-memory-based DBMS 44 if its corresponding internal-writes are for vertices while data loading. If the internal-write is for vertices, then the internal-write is sent to the in memory DBMS extension 44. In a first option, when the internal-write is for vertices, the internal-write is advantageously exported as a recovery file 32. In a second option, when the internal-write is not for vertices, the method advantageously exports all the external-writes to the disk-based DBMS extension 42 as an export file 34, and sends an external-read, via a disk-based DBMS driver 46, for vertices to the in-memory DBMS if the middleware requires/requests it.

The in-memory database 44 is based on a database management system that stores its data collections directly in the working memory of one or more computers. Using random access memory (RAM) has a key advantage in that in-memory databases have significantly faster access speeds. Stored data is then available very quickly when needed. The biggest advantage of using in-memory databases is the significantly higher access speeds resulting from the use of RAM. This also leads to a quicker data analysis. However, it's not only the reduced fetch time that optimizes data analysis. In-memory DBs advantageously make the evaluation of structured and unstructured data possible from any system.

At the end of data loading, the extension 24 advantageously generates files 52 for raw data of the disk-based DBMS 56 from the export-file 34. The extension 24 advantageously sends the raw files 52 to the disk-based DBMS 56 via a disk-based DBMS tool 54 thereby providing a way to directly add files for its raw data using disk-based DBMS. The converter 50 advantageously converts the export file 34 to raw files 52.

FIG. 2 is an exemplary flowchart illustrating a methodology when receiving an internal-write, in accordance with an embodiment of the present invention.

At block 102, an internal-write is received.

At block 104, it is determined whether the internal-write relates to vertices.

If NO, the process proceeds to block 110. If YES, the process proceeds to block 106.

At block 106, the internal-write is sent to the in-memory DBMS extension.

At block 108, the internal-write is appended to the recovery-file, when the internal-write is for vertices.

At block 110, the internal-write is appended to the export-file, when the internal-write is not for vertices.

FIG. 3 is an exemplary flowchart illustrating a methodology when receiving an internal-read, in accordance with an embodiment of the present invention.

At block 152, an internal-read is received.

At block 154, the internal-read is sent to the in-memory DBMS extension and the result is received.

At block 156, it is determined whether the result includes a record.

If YES, the process proceeds to block 160. If NO, the process proceeds to block 158.

At block 158, the internal-read is sent to the disk-based DBMS extension and the result is received.

At block 160, the result is returned to the caller.

Figure 4:
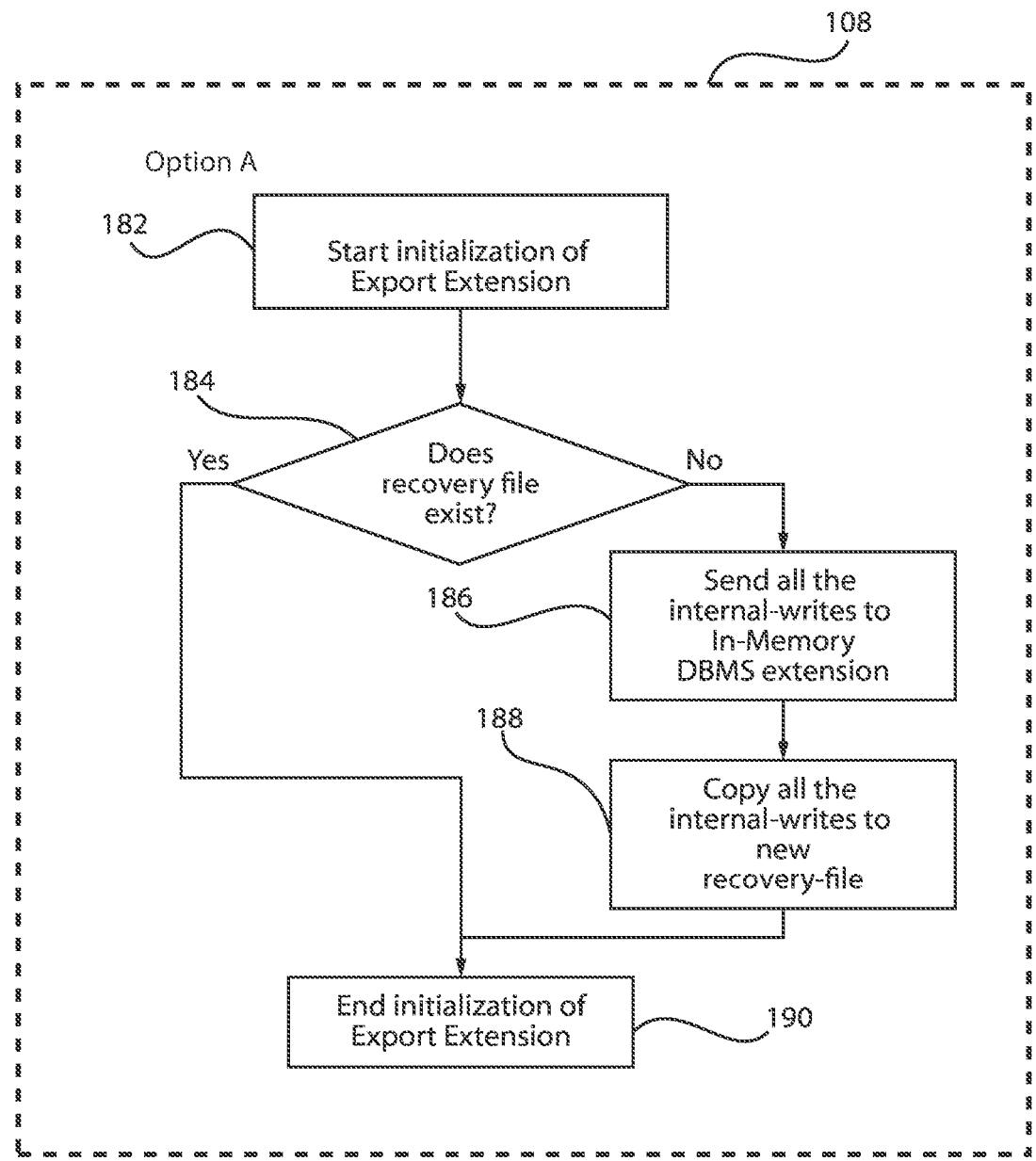
FIG. 4 is an exemplary flowchart illustrating a methodology for starting initialization of export extension, in accordance with an embodiment of the present invention.

FIG. 4 is an exemplary flowchart illustrating a methodology for starting initialization of export extension, in accordance with an embodiment of the present invention.

Regarding the appending of the internal-write to the recovery file or block 108, the following takes place.

At block 182, the initialization of the export extension is commenced.

At block 184, it is determined whether the recovery-file exists.

If YES, the process proceeds to block 190. If NO, the process proceeds to block 186.

At block 186, all the internal-writes are sent to the in-memory DBMS extension.

At block 188, all the internal writes are copied to the new recovery-file.

At block 190, the initialization of the export extension is ended.

Figure 5:
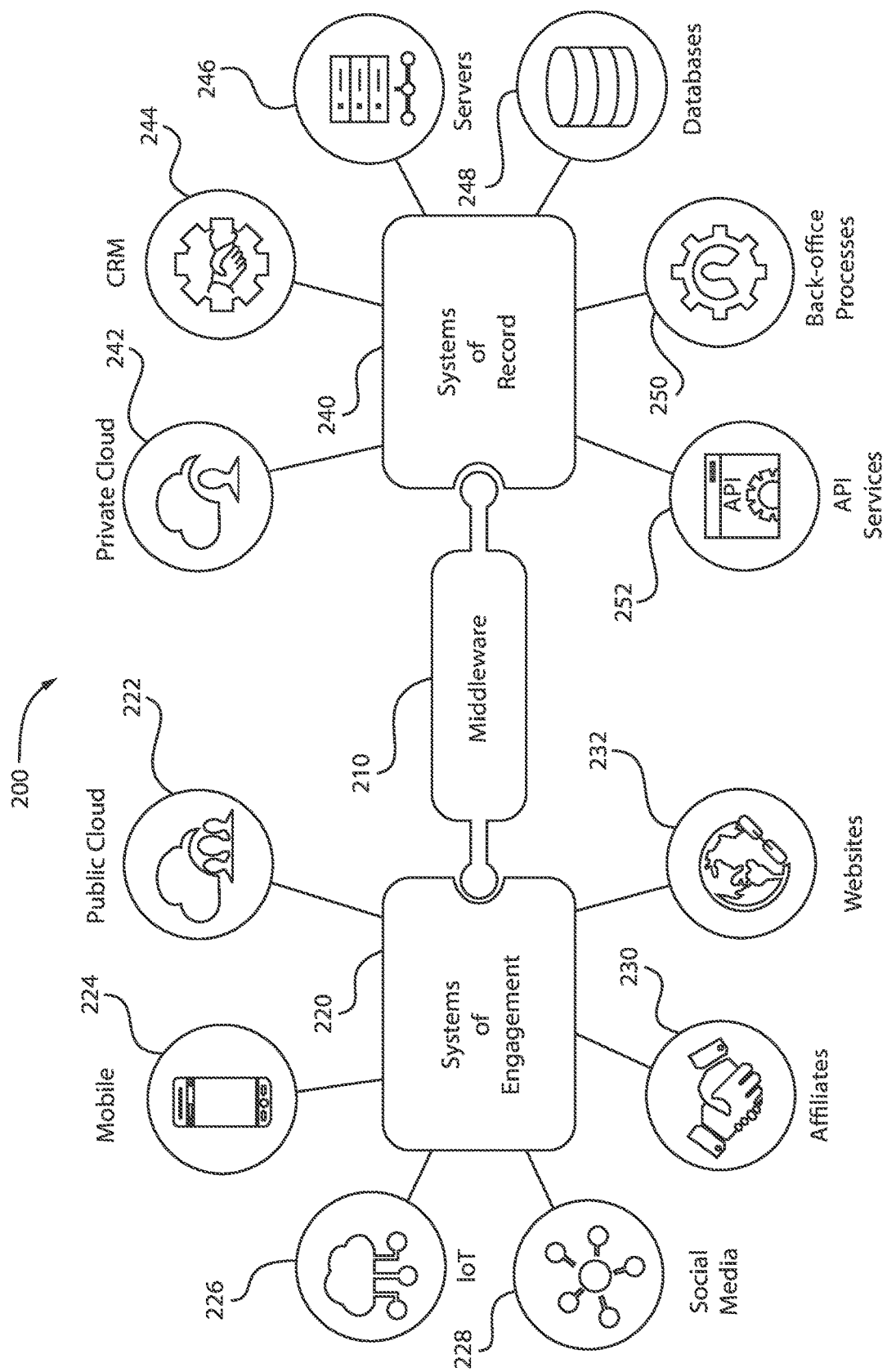
FIG. 5 is an exemplary middleware diagram, in accordance with an embodiment of the present invention.

FIG. 5 is an exemplary middleware diagram, in accordance with an embodiment of the present invention.

Middleware can be described as the glue that combines two separate, already existing software programs. Generally, middleware can be a variety of different, specifically designed software. Middleware is a type of software that makes it easier for software developers to implement communication and input/output, between the two programs, so software developers can focus on the specific purpose of their application. Acting as almost an extension to the existing operating systems, middleware helps to integrate software between applications and services.

Middleware can be used to connect any two pieces of software. Middleware works by allowing data to be passed between the two. One example of the use of middleware is when middleware is used to connect a database system with a web server. This allows the user to request data from the database using forms displayed on a web browser. Middleware is software that provides common services and capabilities to applications outside of what's offered by the operating system. Data management, application services, messaging, authentication, and API management are all commonly handled by middleware. Moreover, middleware helps developers build applications more efficiently. Middleware acts like the connective tissue between applications, data, and users. For organizations with multi-cloud and containerized environments, middleware can make it cost-effective to develop and run applications at scale.

In middleware diagram 200, middleware 210 advantageously connects systems of engagement 220 with systems of record 240. The systems of engagement 220 can include, but are not limited to, public cloud systems 222, mobile systems 224, internet-of-things (IoT) systems 226, social media systems 228, affiliates 230, and websites 232. The systems of record can include, but are not limited to, private clouds 242, customer relationship management (CRM) 244, servers 246, databases 248, back-office processes 250, and application programming interface (API) services 252.

Figure 11:
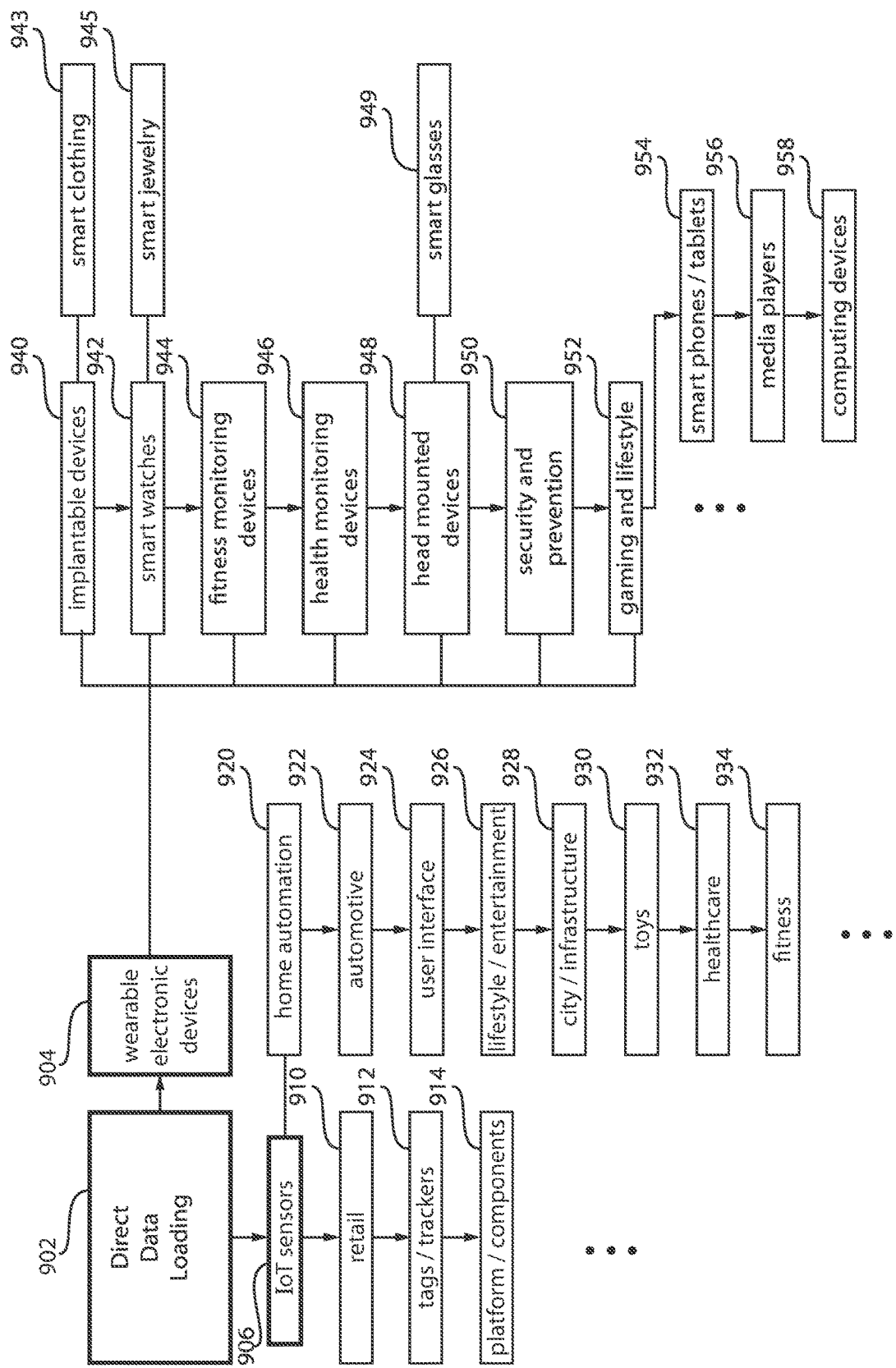
FIG. 11 is a block/flow diagram of a method for applying the middleware architecture of FIG. 1 with Internet of Things (IoT) systems/devices/infrastructure, in accordance with an embodiment of the present invention.
Figure 12:
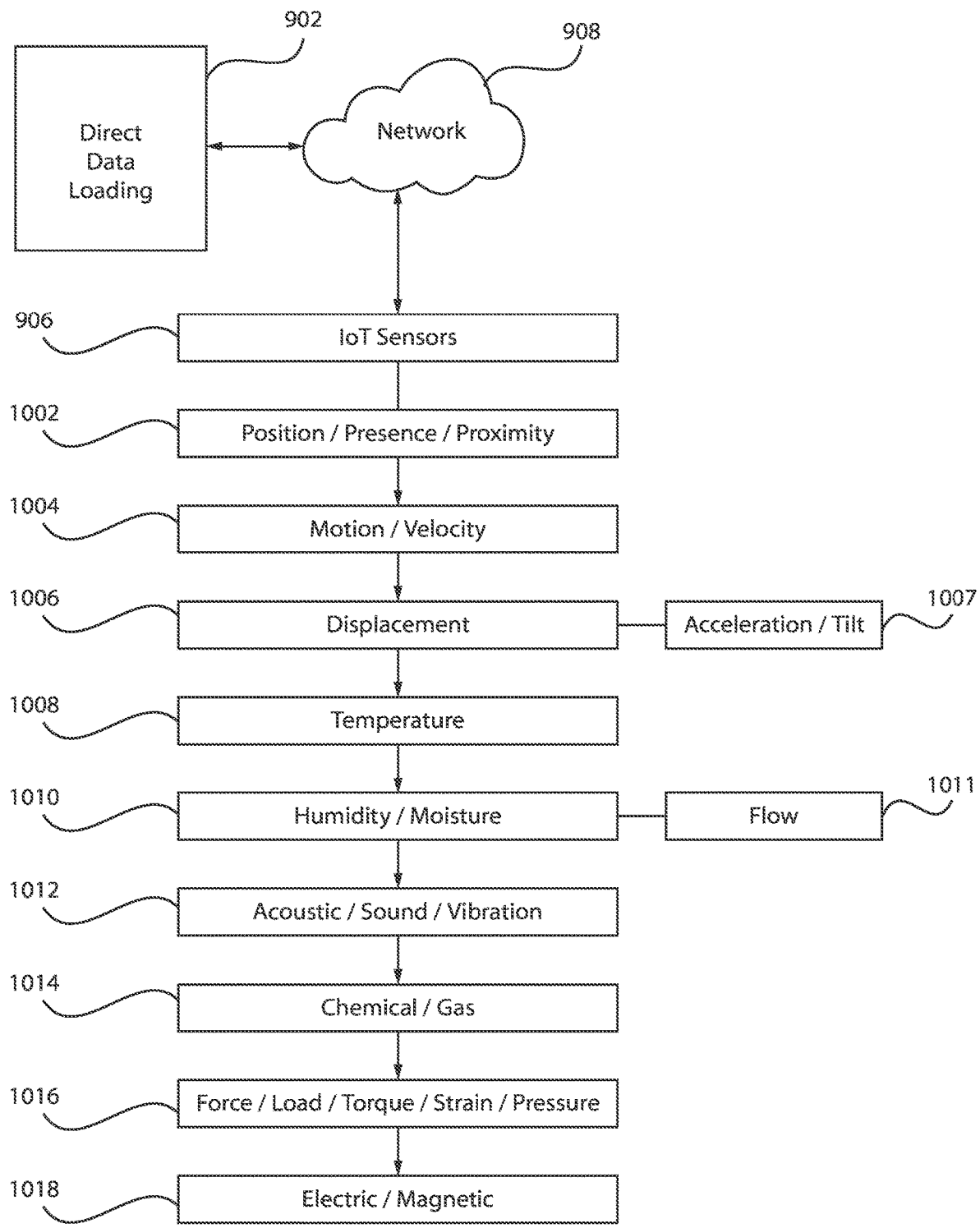
FIG. 12 is a block/flow diagram of exemplary IoT sensors used to collect data/information related to the middleware architecture of FIG. 1, in accordance with an embodiment of the present invention.

FIGS. 11 and 12 below will illustrate one practical application related to IoT systems 226 advantageously employing middleware 210 to connect with systems of record 240.

Figure 6:
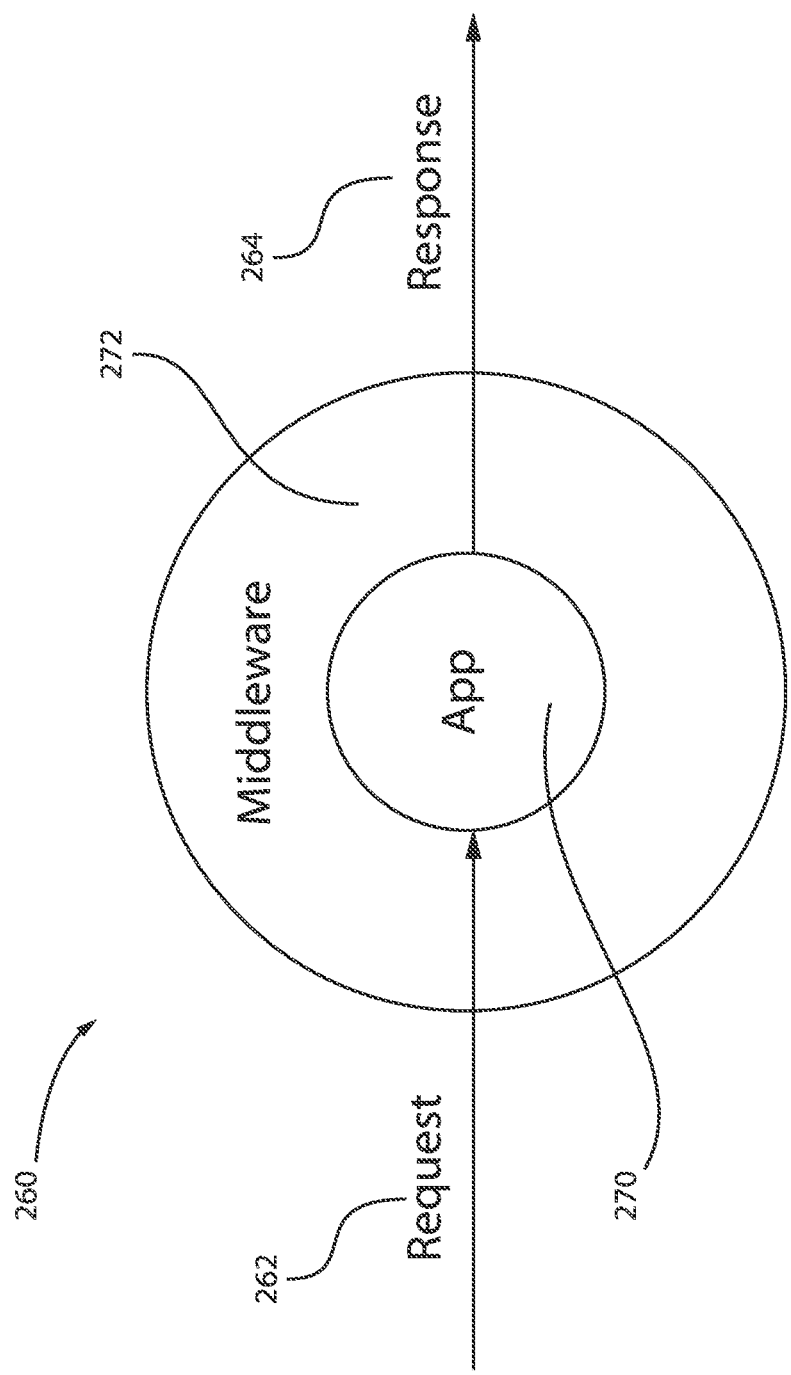
FIG. 6 is an exemplary diagram illustrating a request/response cycle, in accordance with an embodiment of the present invention.

FIG. 6 is an exemplary diagram illustrating a request/response cycle, in accordance with an embodiment of the present invention.

In diagram 260 the requests 262 and the responses 264 for the application 270 are handled by the middleware 272. A "middleware" 272 is a function that works with every request 262 before it is processed by any specific path operation, and also with every response before returning it. Middleware 272 takes each request 262 that comes to the application 270. Middleware 272 can then do something to that request 262 or run any needed code. Then the middleware 272 passes the request 262 to be processed by the rest of the application 270 (by some path operation). Middleware 272 then takes the response 264 generated by the application 270 (by some path operation). Middleware 272 can do something to that response 264 or run any needed code. Then the middleware 272 returns the response 264.

Figure 7:
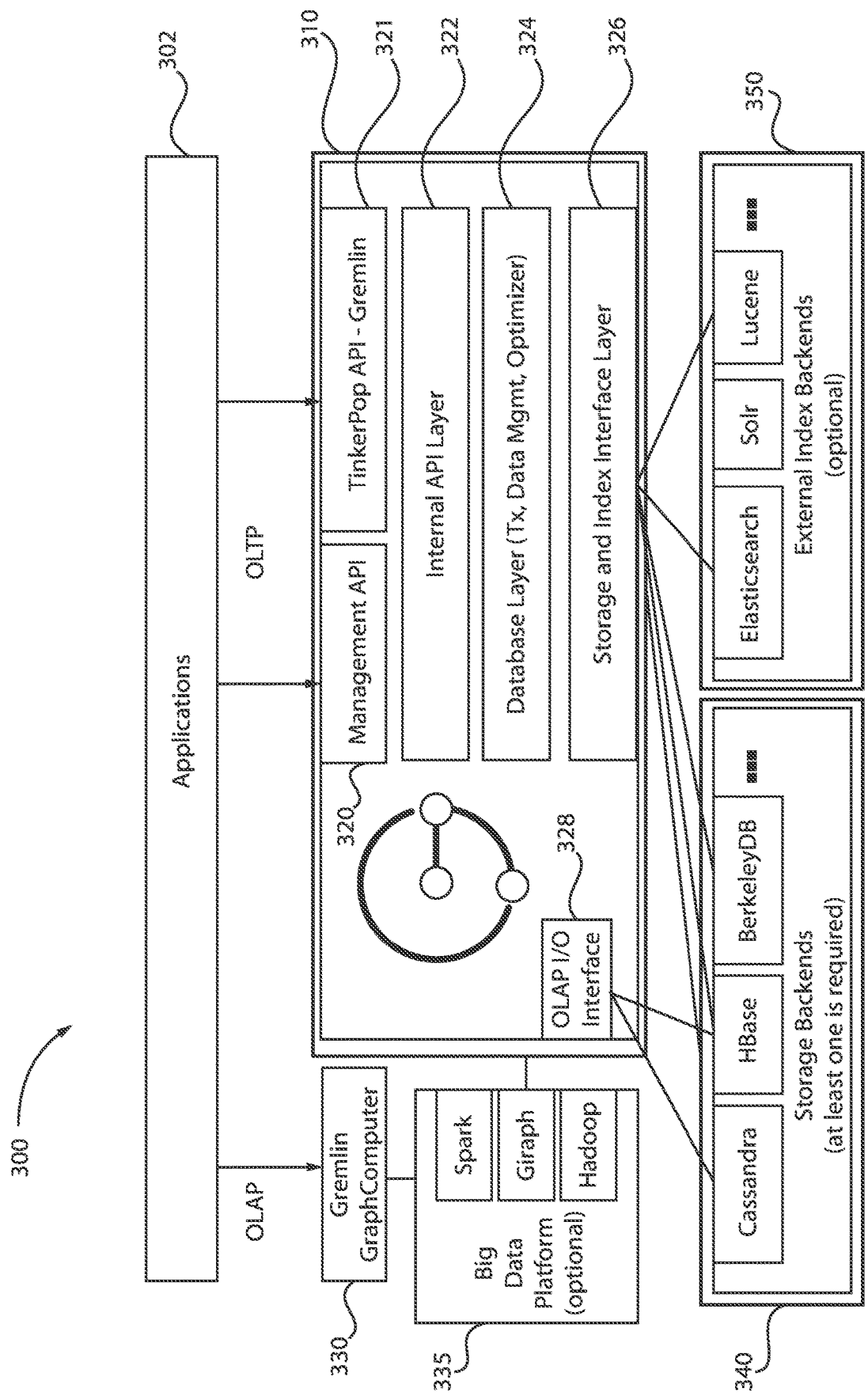
FIG. 7 is an exemplary JanusGraph architecture, in accordance with an embodiment of the present invention.

FIG. 7 is an exemplary JanusGraph architecture, in accordance with an embodiment of the present invention.

JanusGraph is a scalable transactional property graph database. A property graph is a mapping between entities (which are referred to as vertices) by their relationships (which are referred to as edges). Property graph queries can traverse multiple edges and vertices to help illuminate the relationships between entities. Thus, JanusGraph is a scalable graph database that has the advantage of being optimized for storing and querying graphs including hundreds of billions of vertices and edges distributed across a multi-machine cluster.

The JanusGraph architecture 300 includes applications 302 fed into the JanusGraph 310 and the Gremlin Graph Computer 330. The Gremlin Graph Computer 330 communicates with big data platform 335.

The storage backend 340 is pluggable and supports at least Cassandra, HBase, BerkeleyDB, Google BigTable and an in-memory storage option. The storage backend 340 is where the data is actually stored. Given its flexibility to work with numerous database engines, the storage backend 340 has the advantage of allowing a user to pick an option that might already have been deployed or possessed expertise in by the user. There is only one storage backend 340.

Next for the external index backend 350, at least Elasticsearch, Solr, and Lucene are supported. The external index backend 350 is optional, but necessary for indexing on multiple properties, full text and string searches, and geo-mapping. Once again there is only one external index backend 350.

After the storage backends 340, 350, the TinkerPop™ API 321 in Gremlin box 310 represents how a user can interact with the graph. It's commonly known as the Gremlin Console and is an example of an application that invokes the TinkerPop™ API 321. This is the command line interface used to interact with JanusGraph.

Finally, 310 represents the JanusGraph Server. This piece runs with a script named gremlin_server.sh. Gremlin Server is a part of the Apache TinkerPop™ project. JanusGraph essentially has the advantage of acting as a plugin for Gremlin Server and tells the Gremlin Server how, and where, to store graph data. The JanusGraph Server 310 advantageously includes management API 320, internal API layer 322, database layer 324, storage and index interface layer 326, as well as an OLAP input/output (I/O) interface 328.

Gremlin is Titan's query language used to retrieve data from and modify data in the graph. Gremlin is a path-oriented language which succinctly expresses complex graph traversals and mutation operations. Gremlin is a functional language whereby traversal operators are chained together to form path-like expressions. Gremlin works for both online transaction processing (OLTP)-based graph databases as well as online analytical processing (OLAP)-based graph processors. Gremlin's automata and functional language foundation enable Gremlin to naturally support imperative and declarative querying, host language agnosticism, user-defined domain specific languages, an extensible compiler/optimizer, single- and multi-machine execution models, and hybrid depth- and breadth-first evaluation.

In summary, the exemplary embodiments of the present invention advantageously assume middleware converts an internal representation of an update (internal-write) to one or more commands of updates (external-write) for DBMS. Moreover, an internal-write for vertices can be advantageously identified in data loading, middleware can advantageously support disk-based and memory-based DBMS, and disk-based DBMS advantageously provides a way to directly add files for its raw data. The exemplary embodiments of the present invention advantageously employ an extension of middleware that manages both disk-based and memory-based DBMS. While data loading, the extension sends external-writes to the memory-based DBMS if its corresponding internal-writes are for vertices, exports the internal-writes as a file (recovery-file), exports all the external-write to disk-based DBMS as a file (export-file), and sends an external-read for vertices to the in-memory DBMS if middleware requires a data. In another option, the extension sends an external-read to the disk-based DBMS if the in-memory DBMS does not fetch any. At the end of data loading, the extension or the other component generates files for raw data of the disk-based DBMS from the export-file and sends them to the disk-based DBMS. In another embodiment, at the beginning of data loading, if a recovery-file exits, the extension generates external-writes to the memory-based DBMS from the file and sends them to the memory-based DBMS.

The advantages of the present invention include reducing data loading via middleware. The advantages of the present invention further include more efficient CPU utilization and more efficient I/O bandwidth utilization. Data loading is an upfront investment that DBMSs have to undertake in order to be able to support efficient query execution. Given the amount of data gathered by applications, it is important to minimize the overhead of data loading to prevent data loading from becoming a bottleneck in the data analytics pipeline. This results in a higher storage capacity, faster processing, and better transfer speed of the unstructured data. Further advantages include higher quality, reduced cost, clearer scope, faster performance, fewer application errors, and fewer data errors.

Figure 8:
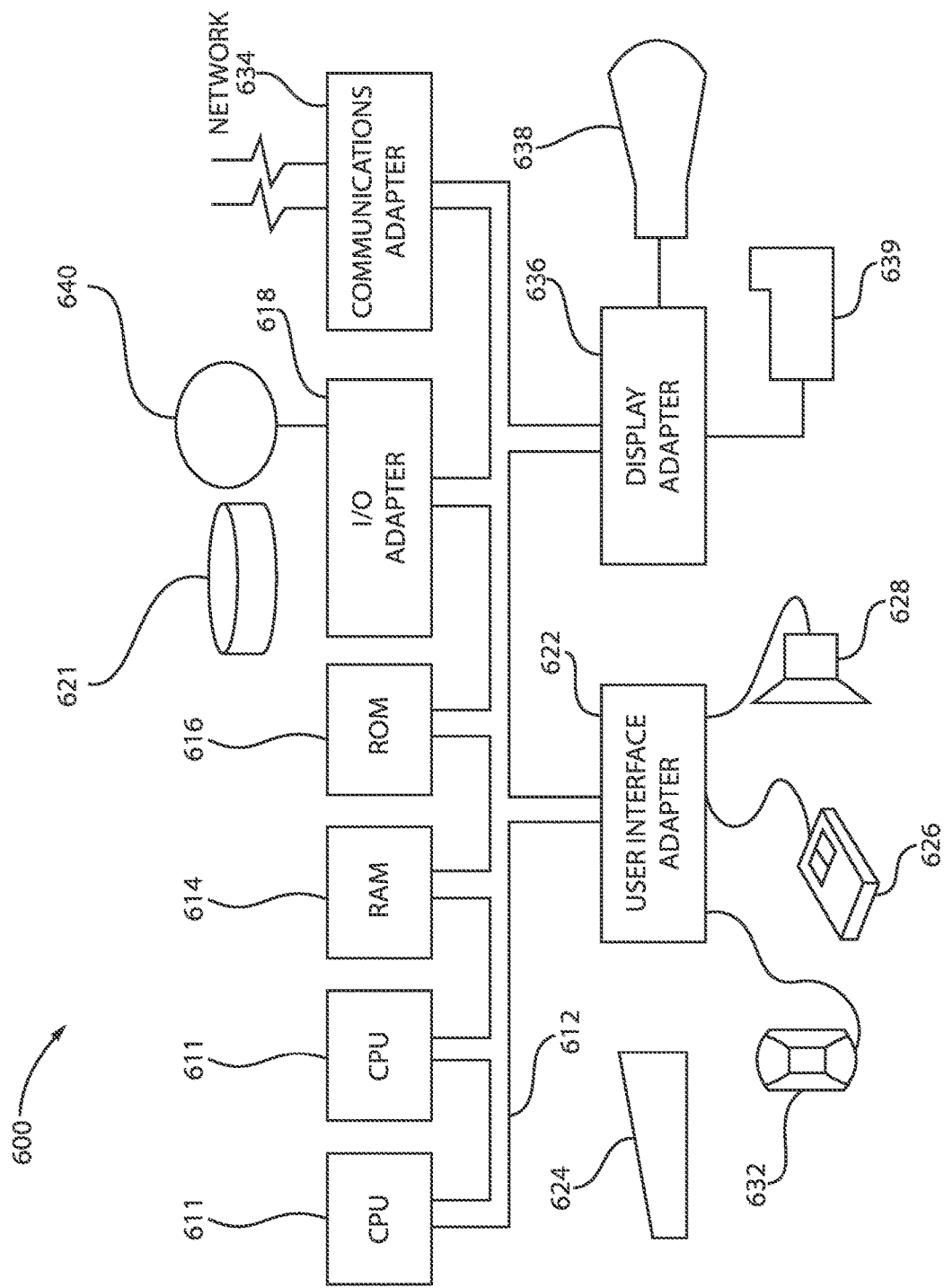
FIG. 8 is an exemplary processing system, in accordance with an embodiment of the present invention.

FIG. 8 is an exemplary processing system for handling streaming algorithms, in accordance with embodiments of the present invention.

Referring now to FIG. 8, this figure shows a hardware configuration of computing system 600 according to an embodiment of the present invention. As seen, this hardware configuration has at least one processor or central processing unit (CPU) 611. The CPUs 611 are interconnected via a system bus 612 to a random access memory (RAM) 614, read-only memory (ROM) 616, input/output (I/O) adapter 618 (for connecting peripheral devices such as disk units 621 and tape drives 640 to the bus 612), user interface adapter 622 (for connecting a keyboard 624, mouse 626, speaker 628, microphone 632, and/or other user interface device to the bus 612), a communications adapter 634 for connecting the system 600 to a data processing network, the Internet, an Intranet, a local area network (LAN), etc., and a display adapter 636 for connecting the bus 612 to a display device 638 and/or printer 639 (e.g., a digital printer or the like).

Figure 9:
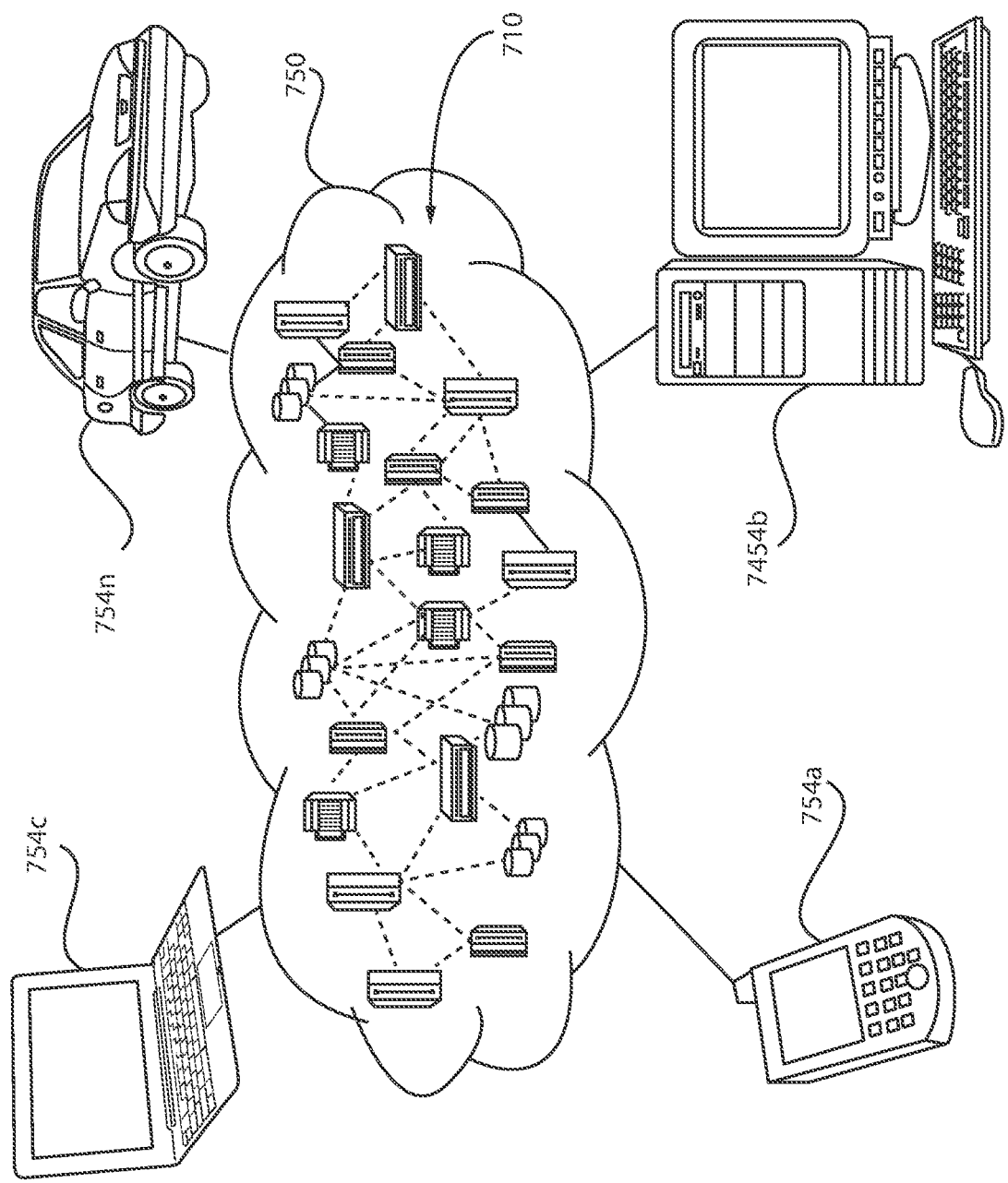
FIG. 9 is a block/flow diagram of an exemplary cloud computing environment, in accordance with an embodiment of the present invention.

FIG. 9 is a block/flow diagram of an exemplary cloud computing environment, in accordance with an embodiment of the present invention.

FIG. 9 is a block/flow diagram of an exemplary cloud computing environment, in accordance with an embodiment of the present invention.

It is to be understood that although this invention includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 9, illustrative cloud computing environment 750 is depicted for enabling use cases of the present invention. As shown, cloud computing environment 750 includes one or more cloud computing nodes 710 with which local computing devices used by cloud consumers, such as, for example, personal digital assistant (PDA) or cellular telephone 754A, desktop computer 754B, laptop computer 754C, and/or automobile computer system 754N can communicate. Nodes 710 can communicate with one another. They can be grouped (not shown) physically or virtually, in one or more networks, such as Private, Community, Public, or Hybrid clouds as described hereinabove, or a combination thereof. This allows cloud computing environment 750 to offer infrastructure, platforms and/or software as services for which a cloud consumer does not need to maintain resources on a local computing device. It is understood that the types of computing devices 754A-N shown in FIG. 9 are intended to be illustrative only and that computing nodes 710 and cloud computing environment 750 can communicate with any type of computerized device over any type of network and/or network addressable connection (e.g., using a web browser).

Figure 10:
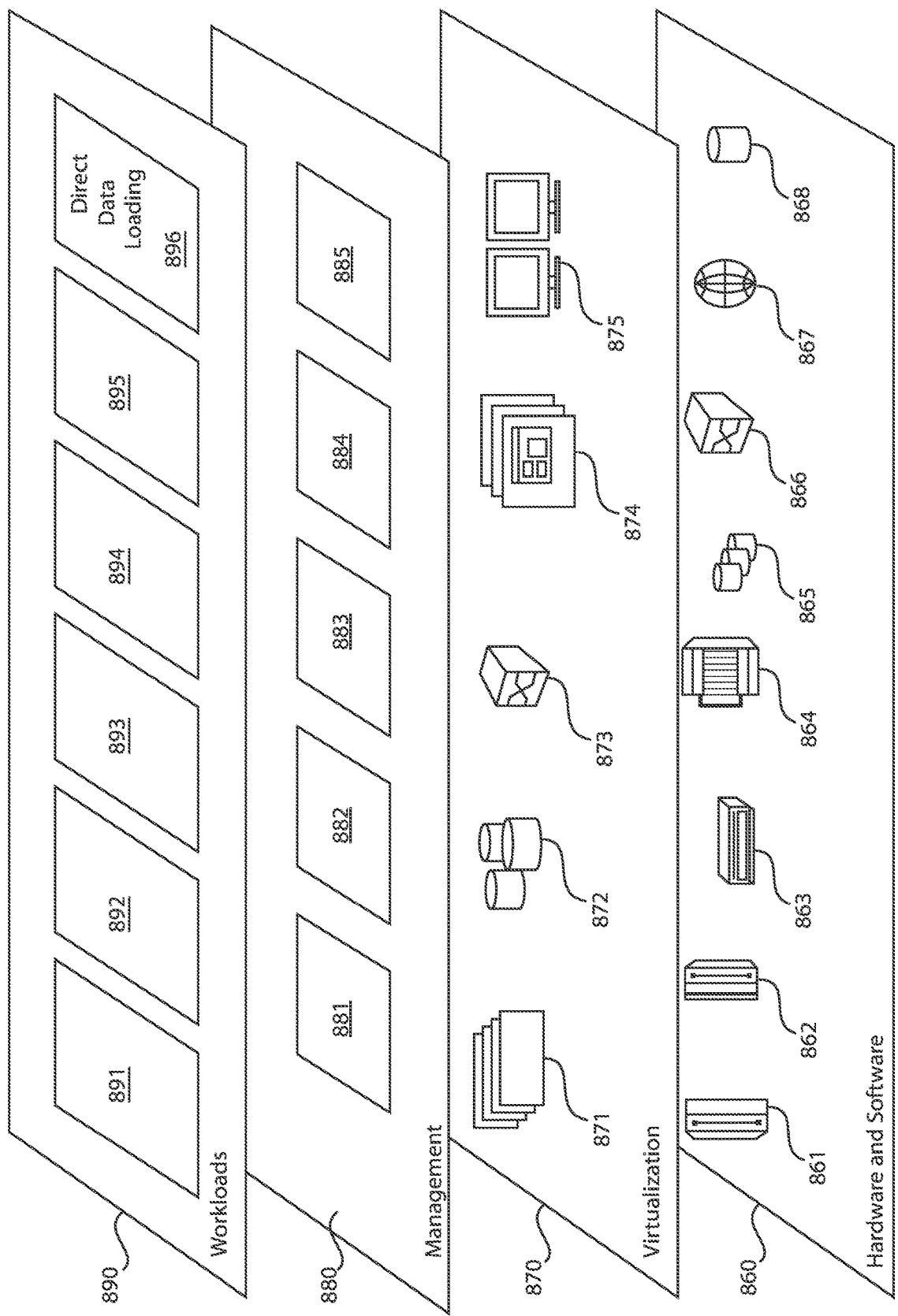
FIG. 10 is a schematic diagram of exemplary abstraction model layers, in accordance with an embodiment of the present invention.

FIG. 10 is a schematic diagram of exemplary abstraction model layers, in accordance with an embodiment of the present invention. It should be understood in advance that the components, layers, and functions shown in FIG. 10 are intended to be illustrative only and embodiments of the invention are not limited thereto. As depicted, the following layers and corresponding functions are provided:

Hardware and software layer 860 includes hardware and software components. Examples of hardware components include: mainframes 861; RISC (Reduced Instruction Set Computer) architecture based servers 862; servers 863; blade servers 864; storage devices 865; and networks and networking components 866. In some embodiments, software components include network application server software 867 and database software 868.

Virtualization layer 870 provides an abstraction layer from which the following examples of virtual entities can be provided: virtual servers 871; virtual storage 872; virtual networks 873, including virtual private networks; virtual applications and operating systems 874; and virtual clients 875.

In one example, management layer 880 can provide the functions described below. Resource provisioning 881 provides dynamic procurement of computing resources and other resources that are utilized to perform tasks within the cloud computing environment. Metering and Pricing 882 provide cost tracking as resources are utilized within the cloud computing environment, and billing or invoicing for consumption of these resources. In one example, these resources can include application software licenses. Security provides identity verification for cloud consumers and tasks, as well as protection for data and other resources. User portal 883 provides access to the cloud computing environment for consumers and system administrators. Service level management 884 provides cloud computing resource allocation and management such that required service levels are met. Service Level Agreement (SLA) planning and fulfillment 885 provide pre-arrangement for, and procurement of, cloud computing resources for which a future requirement is anticipated in accordance with an SLA.

Workloads layer 890 provides examples of functionality for which the cloud computing environment can be utilized. Examples of workloads and functions which can be provided from this layer include: mapping and navigation 891; software development and lifecycle management 892; virtual classroom education delivery 893; data analytics processing 894; transaction processing 895; and direct data loading 896.

FIG. 11 is a block/flow diagram of a method for applying the middleware architecture of FIG. 1 with Internet of Things (IoT) systems/devices/infrastructure, in accordance with an embodiment of the present invention.

According to some embodiments of the invention, a network is implemented using an IoT methodology. For example, direct data loading 902 can be incorporated, e.g., into wearable, implantable, or ingestible electronic devices and Internet of Things (IoT) sensors. The wearable, implantable, or ingestible devices can include at least health and wellness monitoring devices, as well as fitness devices. The wearable, implantable, or ingestible devices can further include at least implantable devices, smart watches, head-mounted devices, security and prevention devices, and gaming and lifestyle devices. The IoT sensors can be incorporated into at least home automation applications, automotive applications, user interface applications, lifestyle and/or entertainment applications, city and/or infrastructure applications, toys, healthcare, fitness, retail tags and/or trackers, platforms and components, etc. The direct data loading 902 described herein can be incorporated into any type of electronic devices for any type of use or application or operation.

IoT systems allow users to achieve deeper automation, analysis, and integration within a system. IoT improves the reach of these areas and their accuracy. IoT utilizes existing and emerging technology for sensing, networking, and robotics. Features of IoT include artificial intelligence, connectivity, sensors, active engagement, and small device use. In various embodiments, the direct data loading 902 of the present invention can be incorporated into a variety of different devices and/or systems. For example, the direct data loading 902 can be incorporated into wearable or portable electronic devices 904. Wearable/portable electronic devices 904 can include implantable devices 940, such as smart clothing 943. Wearable/portable devices 904 can include smart watches 942, as well as smart jewelry 945. Wearable/portable devices 904 can further include fitness monitoring devices 944, health and wellness monitoring devices 946, head-mounted devices 948 (e.g., smart glasses 949), security and prevention systems 950, gaming and lifestyle devices 952, smart phones/tablets 954, media players 956, and/or computers/computing devices 958.

The direct data loading 902 of the present invention can be further incorporated into Internet of Thing (IoT) sensors 906 for various applications, such as home automation 920, automotive 922, user interface 924, lifestyle and/or entertainment 926, city and/or infrastructure 928, retail 910, tags and/or trackers 912, platform and components 914, toys 930, and/or healthcare 932, as well as fitness 934. The IoT sensors 906 can employ the direct data loading 902. Of course, one skilled in the art can contemplate incorporating such direct data loading 902 into any type of electronic devices for any types of applications, not limited to the ones described herein.

FIG. 12 is a block/flow diagram of exemplary IoT sensors used to collect data/information related to the middleware architecture of FIG. 1, in accordance with an embodiment of the present invention.

IoT loses its distinction without sensors. IoT sensors act as defining instruments which transform IoT from a standard passive network of devices into an active system capable of real-world integration.

The IoT sensors 906 can employ the direct data loading 902 to transmit information/data, continuously and in real-time, via a network 908, to any type of distributed system. Exemplary IoT sensors 906 can include, but are not limited to, position/presence/proximity sensors 1002, motion/velocity sensors 1004, displacement sensors 1006, such as acceleration/tilt sensors 1007, temperature sensors 1008, humidity/moisture sensors 1010, as well as flow sensors 1011, acoustic/sound/vibration sensors 1012, chemical/gas sensors 1014, force/load/torque/strain/pressure sensors 1016, and/or electric/magnetic sensors 1018. One skilled in the art can contemplate using any combination of such sensors to collect data/information of the distributed system for further processing. One skilled in the art can contemplate using other types of IoT sensors, such as, but not limited to, magnetometers, gyroscopes, image sensors, light sensors, radio frequency identification (RFID) sensors, and/or micro flow sensors. IoT sensors can also include energy modules, power management modules, RF modules, and sensing modules. RF modules manage communications through their signal processing, WiFi, ZigBee®, Bluetooth®, radio transceiver, duplexer, etc.

Figure 13:
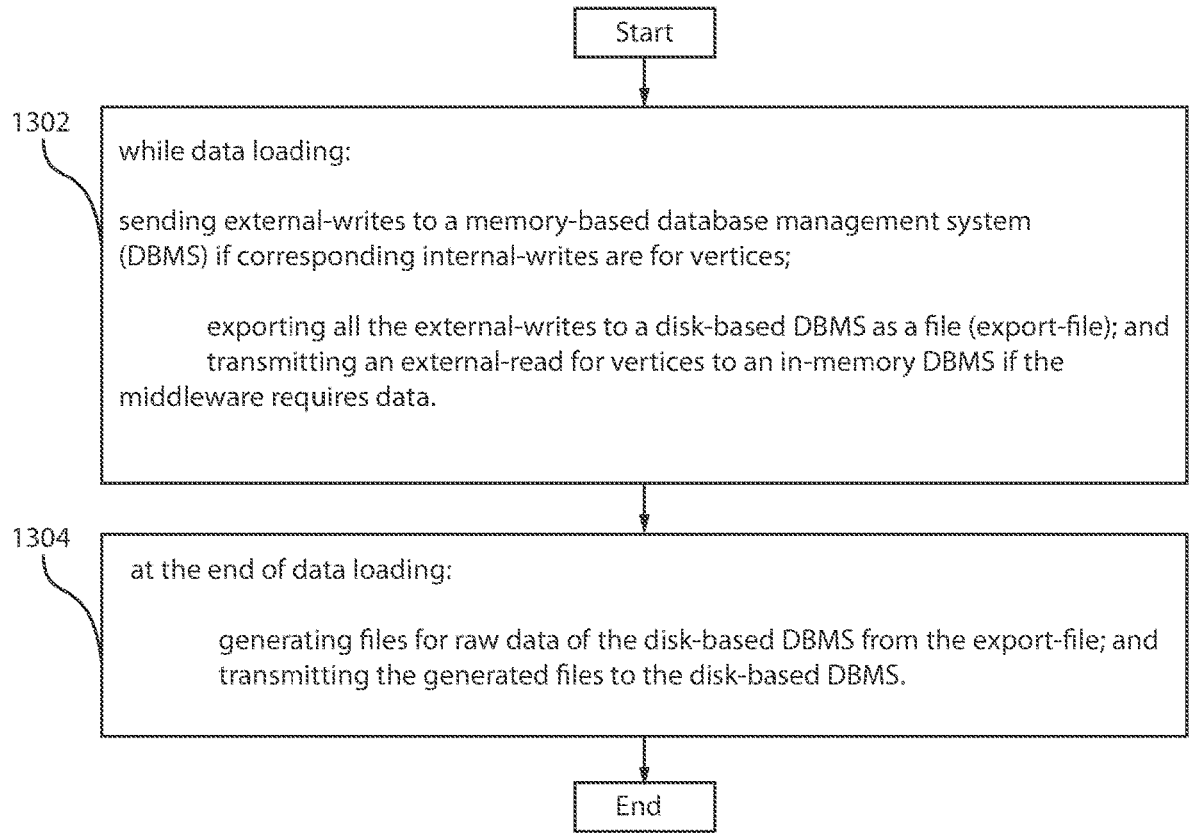
FIG. 13 is a block/flow diagram of an exemplary method for direct data loading of middleware-generated records to DBMS, in accordance with an embodiment of the present invention.

FIG. 13 is a block/flow diagram of an exemplary method for learning relationships between multiple event types, in accordance with an embodiment of the present invention.

At block 1302, while data loading, send external-writes to a memory-based database management system (DBMS) if corresponding internal-writes are for vertices, export all the external-writes to a disk-based DBMS as a file (export-file), and transmit an external-read for vertices to an in-memory DBMS if the middleware requires data.

At block 1304, at the end of data loading, generate files for raw data of the disk-based DBMS from the export-file and transmit the generated files to the disk-based DBMS.

The present invention can be a system, a method, and/or a computer program product. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to at least one processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks or modules. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks or modules.

The computer readable program instructions can also be loaded onto a computer, other programmable data processing apparatus, or other device to cause a series of operational blocks/steps to be performed on the computer, other programmable apparatus or other device to produce a computer implemented process, such that the instructions which execute on the computer, other programmable apparatus, or other device implement the functions/acts specified in the flowchart and/or block diagram block or blocks or modules.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which includes one or more executable instructions for implementing the specified logical function(s). In some alternative implementations, the functions noted in the blocks can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This can be extended, as readily apparent by one of ordinary skill in this and related arts, for as many items listed.

Having described preferred embodiments of a system and method for reducing data loading overhead of middleware to facilitate direct data loading to a database management system (DBMS) (which are intended to be illustrative and not limiting), it is noted that modifications and variations can be made by persons skilled in the art in light of the above teachings. It is therefore to be understood that changes may be made in the particular embodiments described which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A computer-implemented method executed on a processor for reducing data loading overhead of middleware to facilitate direct data loading to a database management system (DBMS), the method comprising:
   while data loading:
      sending external-writes to a memory-based DBMS if corresponding internal-writes are for vertices;
      exporting all the external-writes to a disk-based DBMS as an export file; and
      sending an external-read for vertices to an in-memory DBMS if the middleware requests data; and
   at the end of data loading:
      generating files for raw data of the disk-based DBMS from the export file; and
      sending the generated raw files to the disk-based DBMS.

2. The method of claim 1, wherein, while data loading, the sending of the external-writes step further includes exporting the internal-writes as a recovery file.

3. The method of claim 2, wherein, at a start of data loading, if the recovery file exists:
   generating the external-writes to the memory-based DBMS from the recovery file; and
   sending the generated external-writes to the memory-based DBMS.

4. The method of claim 1, wherein, while data loading, the sending of the external-read step further includes sending the external-read to the disk-based DBMS if the in-memory DBMS does not fetch any.

5. The method of claim 1, wherein an export extension of the middleware supports both disk-based DBMS and memory-based DBMS.

6. The method of claim 1, wherein an export extension of the middleware processes the internal-writes and internal reads.

7. The method of claim 1, wherein, if internal-writes are not for vertices, appending the internal-writes to the export file.

8. A non-transitory computer-readable storage medium comprising a computer-readable program executed on a processor for reducing data loading overhead of middleware to facilitate direct data loading to a database management system (DBMS), wherein the computer-readable program when executed on the processor causes a computer to perform the steps of:

while data loading:
  sending external-writes to a memory-based DBMS if corresponding internal-writes are for vertices;
  exporting all the external-writes to a disk-based DBMS as an export file; and
  sending an external-read for vertices to an in-memory DBMS if the middleware requests data; and
at the end of data loading:
  generating files for raw data of the disk-based DBMS from the export file; and
  sending the generated raw files to the disk-based DBMS.

9. The non-transitory computer-readable storage medium of claim 8, wherein, while data loading, the sending of the external-writes step further includes exporting the internal-writes as a recovery file.

10. The non-transitory computer-readable storage medium of claim 9, wherein, at a start of data loading, if the recovery file exists:
  generating the external-writes to the memory-based DBMS from the recovery file; and
  sending the generated external-writes to the memory-based DBMS.

11. The non-transitory computer-readable storage medium of claim 8, wherein, while data loading, the sending of the external-read step further includes sending the external-read to the disk-based DBMS if the in-memory DBMS does not fetch any.

12. The non-transitory computer-readable storage medium of claim 8, wherein an export extension of the middleware supports both disk-based DBMS and memory-based DBMS.

13. The non-transitory computer-readable storage medium of claim 8, wherein an export extension of the middleware processes the internal-writes and internal reads.

14. The non-transitory computer-readable storage medium of claim 8, wherein, if internal-writes are not for vertices, appending the internal-writes to the export file.

15. A system for reducing data loading overhead of middleware to facilitate direct data loading to a database management system (DBMS), the system comprising:
  a memory; and
  one or more processors in communication with the memory configured to:
    while data loading:
      send external-writes to a memory-based DBMS if corresponding internal-writes are for vertices;
      export all the external-writes to a disk-based DBMS as an export file; and
      send an external-read for vertices to an in-memory DBMS if the middleware requests data; and
    at the end of data loading:
      generate files for raw data of the disk-based DBMS from the export file; and
      send the generated raw files to the disk-based DBMS.

16. The system of claim 15, wherein, while data loading, the sending of the external-writes step further includes exporting the internal-writes as a recovery file.

17. The system of claim 16, wherein, at a start of data loading, if the recovery file exists:
  generating the external-writes to the memory-based DBMS from the recovery file; and
  sending the generated external-writes to the memory-based DBMS.

18. The system of claim 15, wherein, while data loading, the sending of the external-read step further includes sending the external-read to the disk-based DBMS if the in-memory DBMS does not fetch any.

19. The system of claim 15, wherein an export extension of the middleware supports both disk-based DBMS and memory-based DBMS.

20. The system of claim 15, wherein an export extension of the middleware processes the internal-writes and internal reads.

21. The system of claim 15, wherein, if internal-writes are not for vertices, appending the internal-writes to the export file.

22. A computer-implemented method executed on a processor for reducing data loading overhead of middleware to facilitate direct data loading to a database management system (DBMS), the method comprising:
  receiving an internal-write in an export extension of the middleware;
  determining whether the internal-write is for vertices;
  sending the internal-write to an in-memory DBMS when the internal write is for vertices; and
  appending the internal-write to a recovery file.

23. The method of claim 22, wherein, if the internal-write is not for vertices, appending the internal-write to an export file.

24. A computer-implemented method executed on a processor for reducing data loading overhead of middleware to facilitate direct data loading to a database management system (DBMS), the method comprising:
  receiving an internal-read in an export extension of the middleware;
  sending the internal-read to an in-memory DBMS to receive a result;
  determining whether the result includes a record; and
  if the result is free of a record, sending the internal-read to a disk-based DBMS.

25. The method of claim 24, wherein, if the result includes a record, the result is returned to a caller.

* * * * *